J. GECMEN.
Apparatus for Sprouting Malt.
No. 53,135.
Patented March 13, 1866.
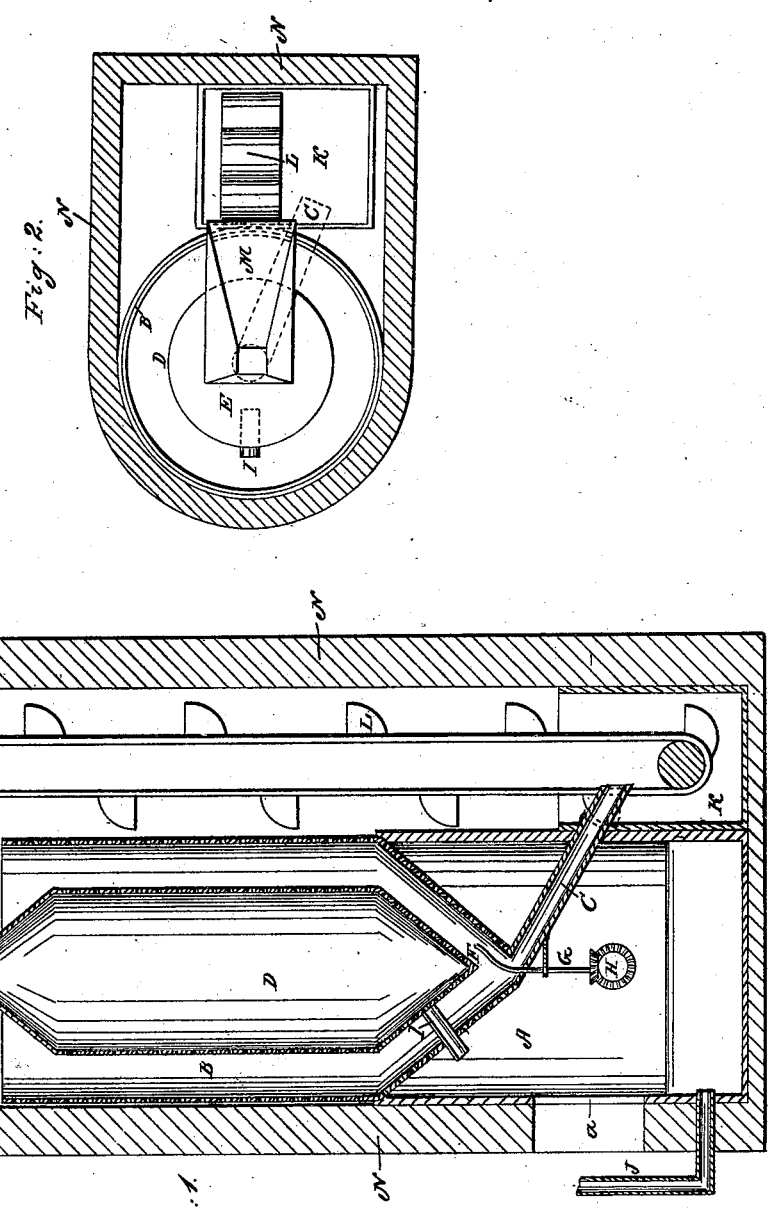
Witnesses:
J. H. Cathel.
E. C. Hard.
Inventor:
Joseph Gecmen.
by Coburn Mary.

UNITED STATES PATENT OFFICE.

JOSEPH GECMEN, OF CHICAGO, ILLINOIS.

IMPROVED APPARATUS FOR SPROUTING MALT.

Specification forming part of Letters Patent No. 53,135, dated March 13, 1866.

*To all whom it may concern:*

Be it known that I, JOSEPH GECMEN, of Chicago, in the county of Cook and State of Illinois, have invented a new and useful Improvement in Apparatus for Sprouting Malt; and I do hereby declare that the following is a full, clear, and exact description of the same, reference being had to the accompanying drawings, and the letters and figures marked thereon, which form part of this specification.

In the ordinary mode of sprouting malt, after it has been soaked for a suitable length of time, it is spread upon a floor, where it has to be subjected to frequent turnings and stirrings until the process is completed and the malt is ready for the kiln. This mode involves a great expense, the necessity for a large area upon which to spread the malt or barley, and much labor in attending to it during the process.

The nature of my invention consists in a novel apparatus arranged vertically, so as to occupy but comparatively little space, wherein the process of sprouting is carried on with the greatest facility, and whereby the requisite stirring or mixing may be accomplished by mechanical appliances and without the necessity for hand labor.

To enable those skilled in the art to understand how to construct and use my invention, I will proceed to describe the same with particularity, making reference in so doing to the aforesaid drawings, in which—

Figure 1 represents a vertical central section, and Fig. 2 a plan or top view, of my invention.

Similar letters of reference in the different figures denote the same parts of the apparatus.

A represents a cylindrical vessel open at the top, provided with a door, *a*, said vessel being designed to contain a suitable quantity of water, as indicated in the drawings.

B represents another cylindrical vessel open at the top, with a funnel-shaped bottom, provided with an outlet-spout, (marked C.) The walls and bottom of said vessel B are perforated with small holes, so that while the grains of barley cannot pass through, the air may freely circulate through them, as hereinafter mentioned. This perforated vessel is supported upon the lower vessel, A, its funnel-shaped bottom extending down into the same, and the outlet-pipe C passing through a suitable opening in the side of A, as shown.

Within the last-described vessel B there is arranged and supported upon standards *b b*, as shown, another close vessel (marked D) provided with a conical top and bottom, the whole of said inner vessel being perforated in the same manner as the vessel B, with the exception of its top E. This vessel D is provided with a pipe, I, which passes through the vessel B by a suitable aperture and opens into the chamber A, as shown.

F represents an arm arranged obliquely upon the shaft G, which is revolved when desired by means of the bevel-gearing H and a shaft extending out through the side of A and the inclosure N, where motion may be communicated to it in any suitable manner.

J represents a pipe connected with any suitable steam-generator, through which steam may be admitted into the water in the chamber A when desired.

K represents a hopper, into which the malt or barley is discharged through the pipe C, to be carried up by the elevator L and discharged through a hopper, M, upon the apex of the top E, which uniformly distributes the same all around the annular space between B and D, which is designed to be about ten inches of space.

N represents an inclosure of brick or other suitable material inclosing the whole apparatus, being provided with a suitable door, O.

The vessels A B D need not be of a cylindrical form, as vessels of any form similarly arranged and constructed will answer the same purpose.

Having described the construction of my invention, I will now describe its operation: The barley having first been soaked in water for the proper length of time, as in the usual process, is placed in the annular space between the vessel B and the inner inclosure, D, it being kept from escaping by the stop-cock or valve *c* in the pipe C, where it remains until it needs to be stirred up or mingled, when the barley is allowed to run into the hopper K and is carried up in the elevator and replaced in the apparatus, as hereinbefore mentioned. This operation is repeated as often and as long as necessary to produce the desired result. During the process the damp air rising from the water passes into the chamber D, whence it permeates the mass of barley surrounding it and keeps it in the proper condition, while by tempering the water the temperature of the apparatus and barley may be kept at the proper degree. By admitting the steam into the water in the chamber A, as hereinbefore indicated, the water is agitated and the air is thoroughly charged with moisture by the condensation of the steam, thus keeping up a continuous supply of damp air to the barley in the apparatus. While the barley is being discharged through the pipe C the stirrer F may be revolved, as aforesaid, to prevent the passage from choking up and impeding the operation of the machine.

Having described the construction and operation of my invention, I will now specify what I claim and desire to secure by Letters Patent:

1. The combination and arrangement of the chamber A, the perforated vessel B, and the perforated air-chamber D, substantially as and for the purposes specified.

2. In combination with the vessel B and discharge-pipe C, the employment of a stirrer, F, arranged and operating substantially as and for the purposes set forth.

3. Providing the air-chamber D, when arranged within the vessel B, with the conical top E, as and for the purposes described.

4. The employment of a water-chamber, A, in combination with the air-chamber D, pipe I, and receiving-vessel B, arranged as specified, and for the purposes set forth.

JOS. GECMEN.

Witnesses:
W. E. MARRS,
J. W. HERTHEL.